(12) United States Patent
Geppert et al.

(10) Patent No.: US 9,325,661 B2
(45) Date of Patent: Apr. 26, 2016

(54) SYSTEM AND METHOD FOR MANAGING A CONTACT CENTER WITH A GRAPHICAL CALL CONNECTION METAPHOR

(75) Inventors: Birgit Geppert, Basking Ridge, NJ (US); Frank Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 195 days.

(21) Appl. No.: 12/749,178

(22) Filed: Mar. 29, 2010

(65) Prior Publication Data
US 2010/0246800 A1   Sep. 30, 2010

Related U.S. Application Data

(60) Provisional application No. 61/164,753, filed on Mar. 30, 2009.

(51) Int. Cl.
*H04M 3/00* (2006.01)
*H04L 12/58* (2006.01)
(Continued)

(52) U.S. Cl.
CPC .............. *H04L 51/36* (2013.01); *G06F 3/0486* (2013.01); *G06F 3/04817* (2013.01); *G06F 3/04842* (2013.01); *H04L 12/1822* (2013.01);
(Continued)

(58) Field of Classification Search
USPC .................. 379/265.01, 265.09, 212, 265.11, 379/265.02, 210.01; 348/14.02
See application file for complete search history.

(56) References Cited

U.S. PATENT DOCUMENTS

| | | | |
|---|---|---|---|
| 5,195,086 | A | 3/1993 | Baumgartner et al. |
| 5,500,934 | A | 3/1996 | Austin et al. |

(Continued)

FOREIGN PATENT DOCUMENTS

| | | |
|---|---|---|
| CN | 1292127 | 4/2001 |
| DE | 19543870 | 5/1996 |

(Continued)

OTHER PUBLICATIONS

Honda et al., "e-MuICS; Multi-Party Conference System with Virtual Space and the Intuitive Input Interface", Proceedings of the 2004 International Symposium on Applications and the Internet (SAINT'04) pp. 56-63, 2004.

(Continued)

*Primary Examiner* — Joseph J Nguyen
(74) *Attorney, Agent, or Firm* — Sheridan Ross P.C.

(57) ABSTRACT

Disclosed herein are systems, methods, and non-transitory computer-readable storage media for managing communications in a callcenter. The method includes presenting via a GUI to a callcenter agent a set of connected graphical elements representing a structure of a communication session including the callcenter agent and a caller, receiving input via the GUI from the callcenter agent to manipulate at least one graphical element, and performing an action based on the input. Further disclosed herein are systems, methods, and non-transitory computer-readable storage media for monitoring communications in a callcenter. The method includes presenting via a GUI a plurality of sets of connected graphical elements, wherein each set of connected graphical elements represents a structure of a communication session including the callcenter agent and a caller, receiving a selection via the GUI based on at least one graphical element to listen in on an associated communication, and monitoring the associated communication session.

20 Claims, 8 Drawing Sheets

(51) Int. Cl.
*G06F 3/0481* (2013.01)
*G06F 3/0486* (2013.01)
*H04L 12/18* (2006.01)
*H04M 1/247* (2006.01)
*H04M 3/56* (2006.01)
*H04W 4/20* (2009.01)
*H04L 29/06* (2006.01)
*G06F 3/0484* (2013.01)
*G06Q 10/10* (2012.01)
*H04M 1/2745* (2006.01)
*H04M 3/42* (2006.01)

(52) U.S. Cl.
CPC .......... *H04L51/046* (2013.01); *H04L 65/1069* (2013.01); *H04L 65/403* (2013.01); *H04M 1/247* (2013.01); *H04M 1/27455* (2013.01); *H04M 3/563* (2013.01); *H04W 4/206* (2013.01); *G06Q 10/10* (2013.01); *H04L 12/581* (2013.01); *H04L 51/04* (2013.01); *H04M 1/274508* (2013.01); *H04M 3/42068* (2013.01); *H04M 3/42161* (2013.01); *H04M 3/42221* (2013.01); *H04M 3/42289* (2013.01); *H04M 3/564* (2013.01); *H04M 2201/42* (2013.01); *H04M 2203/5027* (2013.01); *H04M 2250/22* (2013.01); *H04M 2250/62* (2013.01)

(56) References Cited

U.S. PATENT DOCUMENTS

| | | |
|---|---|---|
| 5,533,110 A | 7/1996 | Pinard et al. |
| 5,627,978 A | 5/1997 | Altom et al. |
| 5,745,711 A | 4/1998 | Kitahara et al. |
| 5,768,552 A | 6/1998 | Jacoby |
| 5,892,764 A | 4/1999 | Riemann et al. |
| 5,896,128 A | 4/1999 | Boyer |
| 5,940,488 A | 8/1999 | DeGrazia et al. |
| 5,999,609 A | 12/1999 | Nishimura |
| 6,067,357 A | 5/2000 | Kishinsky et al. |
| 6,191,807 B1 | 2/2001 | Hamada et al. |
| 6,415,020 B1 | 7/2002 | Pinard et al. |
| 6,445,682 B1 | 9/2002 | Weitz |
| 6,496,201 B1 | 12/2002 | Baldwin et al. |
| 6,501,740 B1 | 12/2002 | Sun et al. |
| 6,559,863 B1 | 5/2003 | Megiddo |
| 6,751,669 B1 | 6/2004 | Ahuja et al. |
| 6,853,398 B2 | 2/2005 | Malzbender et al. |
| D528,553 S | 9/2006 | Nevill-Manning et al. |
| D529,036 S | 9/2006 | Koch et al. |
| D529,037 S | 9/2006 | Koch et al. |
| D529,920 S | 10/2006 | Nevill-Manning et al. |
| 7,124,164 B1 | 10/2006 | Chemtob |
| 7,127,685 B2 | 10/2006 | Canfield et al. |
| 7,162,699 B1 | 1/2007 | Pena-Mora et al. |
| 7,167,182 B2 | 1/2007 | Butler |
| 7,213,206 B2 | 5/2007 | Fogg |
| 7,269,162 B1 | 9/2007 | Turner |
| 7,478,129 B1* | 1/2009 | Chemtob ...................... 709/204 |
| D591,304 S | 4/2009 | Banks et al. |
| 7,519,912 B2 | 4/2009 | Moody et al. |
| D603,866 S | 11/2009 | Banks et al. |
| 7,949,952 B2 | 5/2011 | Hawley et al. |
| 8,082,302 B2 | 12/2011 | Becker et al. |
| 8,144,633 B2 | 3/2012 | Yoakum et al. |
| 8,223,186 B2 | 7/2012 | Derocher et al. |
| 8,243,902 B2 | 8/2012 | Caspi et al. |
| 8,786,664 B2 | 7/2014 | Hornyak et al. |
| 2003/0001890 A1 | 1/2003 | Brin |
| 2003/0133562 A1 | 7/2003 | Ooki |
| 2003/0206619 A1 | 11/2003 | Curbow et al. |
| 2003/0236835 A1 | 12/2003 | Levi et al. |
| 2004/0019683 A1 | 1/2004 | Lee et al. |
| 2004/0028199 A1 | 2/2004 | Carlson |
| 2004/0125937 A1 | 7/2004 | Turcan et al. |
| 2004/0218751 A1* | 11/2004 | Colson et al. ............ 379/265.09 |
| 2004/0258222 A1 | 12/2004 | Kobrosly et al. |
| 2004/0264652 A1* | 12/2004 | Erhart et al. ................ 379/88.01 |
| 2005/0021624 A1 | 1/2005 | Herf et al. |
| 2005/0132012 A1 | 6/2005 | Muller et al. |
| 2005/0141694 A1* | 6/2005 | Wengrovitz ............. 379/265.09 |
| 2005/0151836 A1 | 7/2005 | Ni |
| 2005/0182745 A1 | 8/2005 | Dhillon et al. |
| 2005/0251555 A1 | 11/2005 | Little, II |
| 2006/0019655 A1* | 1/2006 | Peacock ..................... 455/426.1 |
| 2006/0023859 A1* | 2/2006 | Crockett et al. .......... 379/212.01 |
| 2006/0031332 A1 | 2/2006 | Brownholtz et al. |
| 2006/0059236 A1 | 3/2006 | Sheppard et al. |
| 2006/0098793 A1* | 5/2006 | Erhart et al. ................ 379/88.16 |
| 2006/0117264 A1 | 6/2006 | Beaton et al. |
| 2006/0135142 A1 | 6/2006 | Repka |
| 2006/0190546 A1 | 8/2006 | Daniell |
| 2006/0235716 A1 | 10/2006 | Mahesh et al. |
| 2006/0236269 A1 | 10/2006 | Borna |
| 2007/0053308 A1 | 3/2007 | DuMas et al. |
| 2007/0121893 A1* | 5/2007 | Khouri et al. ............ 379/265.02 |
| 2007/0201674 A1* | 8/2007 | Annadata et al. ........ 379/265.01 |
| 2007/0206768 A1* | 9/2007 | Bourne et al. ........... 379/265.01 |
| 2007/0208806 A1 | 9/2007 | Mordecai et al. |
| 2007/0260685 A1 | 11/2007 | Surazski |
| 2007/0288627 A1 | 12/2007 | Abella et al. |
| 2008/0005235 A1 | 1/2008 | Hegde et al. |
| 2008/0043963 A1* | 2/2008 | Kondapalli et al. ...... 379/202.01 |
| 2008/0075247 A1 | 3/2008 | Tanaka et al. |
| 2008/0080386 A1 | 4/2008 | Calahan et al. |
| 2008/0115087 A1 | 5/2008 | Rollin et al. |
| 2008/0120371 A1 | 5/2008 | Gopal |
| 2008/0148156 A1 | 6/2008 | Brewer et al. |
| 2008/0167056 A1 | 7/2008 | Gilzean et al. |
| 2008/0263475 A1 | 10/2008 | Hwang |
| 2008/0266378 A1* | 10/2008 | Ryu ............................ 348/14.02 |
| 2008/0309617 A1 | 12/2008 | Kong et al. |
| 2009/0006980 A1 | 1/2009 | Hawley et al. |
| 2009/0019367 A1 | 1/2009 | Cavagnari et al. |
| 2009/0024952 A1 | 1/2009 | Brush et al. |
| 2009/0054107 A1 | 2/2009 | Feland, III et al. |
| 2009/0059818 A1 | 3/2009 | Pickett |
| 2009/0089683 A1 | 4/2009 | Thapa |
| 2009/0138554 A1 | 5/2009 | Longobardi et al. |
| 2009/0204904 A1 | 8/2009 | Mujkic et al. |
| 2009/0241031 A1 | 9/2009 | Gamaley et al. |
| 2009/0248709 A1 | 10/2009 | Fuhrmann et al. |
| 2009/0249226 A1 | 10/2009 | Manolescu et al. |
| 2009/0319623 A1 | 12/2009 | Srinivasan et al. |
| 2010/0011304 A1 | 1/2010 | van Os |
| 2010/0023585 A1 | 1/2010 | Nersu et al. |
| 2010/0076807 A1 | 3/2010 | Bells et al. |
| 2010/0083137 A1 | 4/2010 | Shin et al. |
| 2010/0085417 A1 | 4/2010 | Satyanarayanan et al. |
| 2010/0162153 A1 | 6/2010 | Lau |
| 2010/0167710 A1 | 7/2010 | Alhainen |
| 2010/0223089 A1 | 9/2010 | Godfrey et al. |
| 2010/0234052 A1 | 9/2010 | Lapstun et al. |
| 2010/0246791 A1 | 9/2010 | Wang et al. |
| 2010/0273447 A1 | 10/2010 | Mann et al. |
| 2010/0312836 A1 | 12/2010 | Serr et al. |
| 2011/0022968 A1 | 1/2011 | Conner et al. |
| 2011/0109940 A1 | 5/2011 | Silverbrook et al. |
| 2011/0151905 A1 | 6/2011 | Lapstun et al. |
| 2011/0191136 A1 | 8/2011 | Bourne et al. |
| 2011/0222675 A1 | 9/2011 | Chua et al. |
| 2011/0296312 A1 | 12/2011 | Boyer et al. |
| 2012/0019610 A1 | 1/2012 | Hornyak et al. |
| 2012/0083252 A1 | 4/2012 | Lapstun et al. |
| 2012/0084672 A1 | 4/2012 | Vonog et al. |
| 2012/0110473 A1 | 5/2012 | Tseng |
| 2012/0216129 A1 | 8/2012 | Ng et al. |
| 2012/0259633 A1 | 10/2012 | Aihara et al. |
| 2013/0080954 A1 | 3/2013 | Carlhian et al. |
| 2013/0108035 A1 | 5/2013 | Lyman |
| 2013/0250038 A1 | 9/2013 | Satyanarayanan et al. |
| 2013/0268866 A1 | 10/2013 | Lyman |

(56) References Cited

U.S. PATENT DOCUMENTS

FOREIGN PATENT DOCUMENTS

| | | |
|---|---|---|
| DE | 19716316 | 10/1998 |
| EP | 0453128 | 10/1991 |
| EP | 0717544 | 6/1996 |
| EP | 1480422 | 11/2004 |
| EP | 1983729 | 10/2008 |
| GB | 2338146 | 12/1999 |
| JP | H7-74834 | 3/1995 |
| JP | H08-251261 | 9/1996 |
| JP | 2004-199644 | 2/1997 |
| JP | 2002-297873 | 10/2002 |
| JP | 2003-296556 | 10/2003 |
| JP | 2004-102389 | 4/2004 |
| JP | H09-055983 | 7/2004 |
| JP | 2004-320235 | 11/2004 |
| JP | 2005-318055 | 11/2005 |
| JP | 2006-050370 | 2/2006 |
| JP | 2006-060340 | 3/2006 |
| JP | 2006-092367 | 4/2006 |
| JP | 2007-004000 | 1/2007 |
| JP | 2007-13694 | 1/2007 |
| JP | 2008-171068 | 7/2008 |
| JP | 2009-20829 | 1/2009 |
| JP | 2009-502048 | 1/2009 |
| JP | 2009-044679 | 2/2009 |
| KR | 2006-0058872 | 6/2006 |
| KR | 2006-0132484 | 12/2006 |
| KR | 2009-0001500 | 1/2009 |
| WO | WO 9821871 | 5/1998 |
| WO | WO 9945716 | 9/1999 |
| WO | WO 0018082 | 3/2000 |
| WO | 2006/054153 | 5/2006 |
| WO | 2006/060340 | 6/2006 |
| WO | 2007/008321 | 1/2007 |

OTHER PUBLICATIONS

WebEx, WebEx Meeting Center User's Guide, 2007, WebEx Communications Inc., Version 8, pp. 1-332.

Byrne et al., "Developing multiparty conferencing services for the NGN: towards a service creation framework", Jun. 2004, ISICT '04: Proceedings of the 2004 International Symposium on Information and Communication.

* cited by examiner

SYSTEM AND METHOD FOR MANAGING A CONTACT CENTER WITH A GRAPHICAL CALL CONNECTION METAPHOR

RELATED APPLICATIONS

This application claims priority to U.S. Provisional Application No. 61/164,753, files 30 Mar. 2009, which is incorporated herein by reference in its entirety.

This application is related to U.S. patent application Ser. No. 12/749,028, filed Mar. 29, 2010, entitled "System and Method for Graphically Managing Communication Sessions" ; U.S. patent application Ser. No. 12/749,058, filed Mar. 29, 2010, entitled "System and Method for Graphically Managing a Communication Session With a Context-Based Contact Set"; U.S. patent application Ser. No. 12/749,094, filed Mar. 29, 2010, entitled "System and Method for Managing Incoming Requests For a Communication Session Using a Graphical Connection Metaphor"; U.S. patent application Ser. No. 12/749,123, filed Mar. 29, 2010, entitled "System and Method for Managing Trusted Relationships in Communication Sessions Using a Graphical Metaphor"; U.S. patent application Ser. No. 12/749,150, filed Mar. 29, 2010, entitled "System and Method for Managing Multiple Concurrent Communication Sessions Using a Graphical Call Connection Metaphor"; U.S. patent application Ser. No. 12/749,103, filed Mar. 29, 2010, entitled "System and Method for Persistent Multimedia Conferencing Services"; and U.S. patent application Ser. No. 12/749,122, filed Mar. 29, 2010, entitled "System and Method for Mode-Neutral Communications with a Widget-Based Communications Metaphor"; each of which is herein incorporated by reference.

BACKGROUND

1. Technical Field

The present disclosure relates to telecommunications and more specifically to call centers. Communication sessions can exist in a variety of modes such as telephone calls, communication sessions, instant messaging sessions, email sessions, video conference sessions, multi-media sessions, and the like.

2. Introduction

Touchtone telephones have been supplemented over the years by the addition of feature buttons and menus. Interfaces for these features have evolved from simple buttons to hierarchical menus actuated by trackballs, quadrant style pointers, and the like. As the number of features increases, the interfaces add more buttons, sequences, and/or combination of button presses. This proliferation of features has led to a multitude of different interfaces with varying levels of complexity. Often users resort to rote memorization of key features, but that is not always practical or desirable. Recently, smartphones with touch-sensitive displays have begun to provide similar functionality. However, the touch-sensitive displays in such devices typically reproduce the feature buttons and menus, albeit on a touch-sensitive display.

Further, users are migrating to other communication forms, such as text messaging, instant messaging, email, chat sessions, video conferencing, and so forth. Incorporating the ability to handle these modes of communication into a traditional telephone increases the complexity and difficulty manyfold.

The specific application of call centers presents a host of application-specific problems, such as high turnover, demand for shorter call times in order to service more customers more efficiently, potentially lower education levels of call center employees, and so forth. Further, call center agents perform many communications operations such as placing customers on hold, performing telephone transfers, conferring with subject matter experts and manager, escalating calls, and so forth. The number, type, and complexity of these operations present a serious difficulty to call center employees, trainers, and managers. What is needed in the art is a more intuitive communication management interface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communication session management in the context of a call center or contact center. A companion case discloses a graphical interface which enables a user to setup a communication session with various users and tear down or remove users from a communication session. A system and method are disclosed which displays on a graphical user interface a set of graphical connected elements representing a structure of a particular communication session or group of communication sessions for call center agents, supervisors, subject matter experts, and managers. A brief introductory description with reference to FIG. 2 will be provided, followed by a discussion of a basic general purpose system in FIG. 1 which can be employed to practice the concepts disclosed herein and more detailed descriptions of methods and graphical interfaces.

Figure 2:
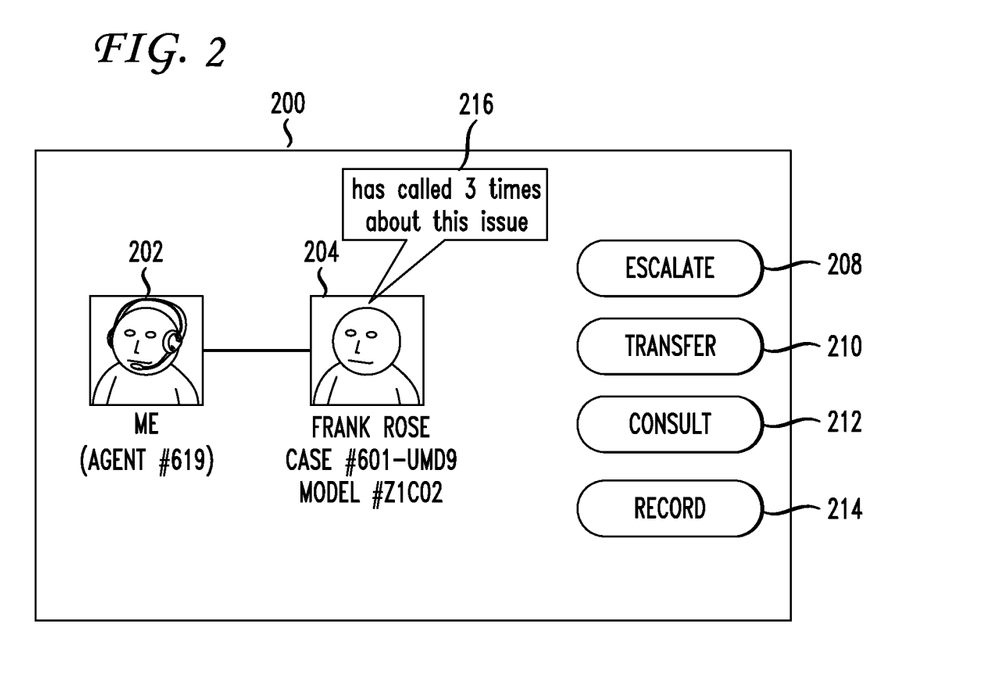
FIG. 2 illustrates an exemplary call center agent display showing a graphical representation of a communication session with a caller.

Presenting the graphical interface of FIG. 2, which illustrates the communication session, enables the system to receive via the interface user input, which can include multimodal user input, to manage the communication session and trusted relationships within the communication session or sessions. For example, a user on a conference call can drag and drop or otherwise move and locate a trusted icon onto individual's devices after which the system establishes a trusted relationship. The system receives that input and automatically contacts the appropriate device and negotiates a trusted relationship and other details related to the trusted relationship.

The communication session is also agnostic with respect to the mode of communication. The same metaphor of a connected user in a communication session being displayed on the graphical interface can represent a called/calling user, an instant messaging (IM) user, an email user, a user connecting via video conferencing, and so forth. The presentation of the graphical elements, how they are connected and how the user interacts with the elements all vary depending on the needs and current active context of the communication session. For example, the elements can include text, titles, positions, data about each user, etc. and the connection metaphor between users can also represent information such as the type of connection (phone, video, etc), the quality of the connection (low-band, high-band, etc.), a hierarchy of how participants are related to the primary user (supervisor, subject matter expert, another call center agent, etc.), a status of the connection (active, inactive, on-hold, etc.), and so forth. These variations shall be discussed throughout this disclosure. The disclosure now turns to FIG. 1.

Figure 1:
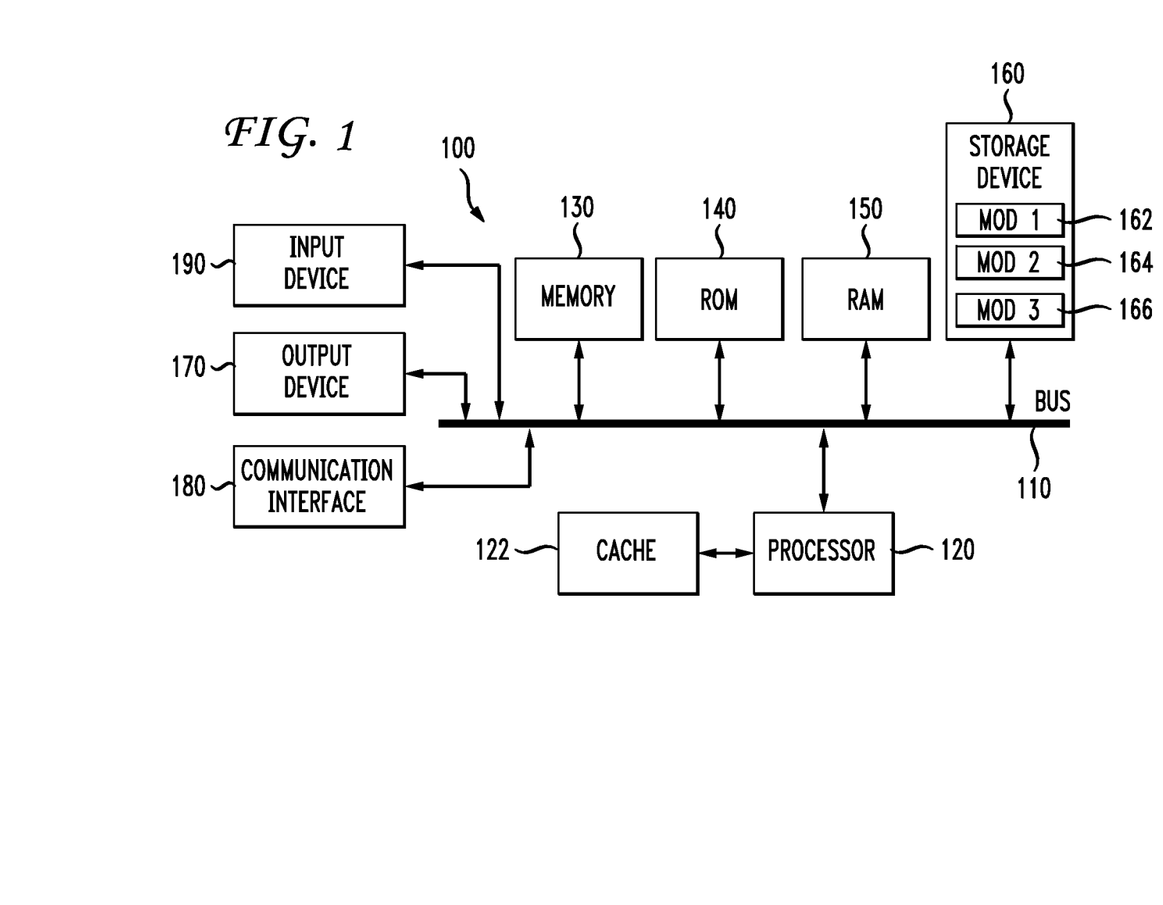
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. If the device includes a graphical display which also receives touch sensitive input, the input device 190 and the output device 170 can be essentially the same element or display. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having briefly discussed the exemplary system embodiment, the disclosure now turns to FIG. 2 and other graphical views of an interface for managing communication sessions in a call center environment. The communication session can be a telephone call, such as a technical support or customer service call, between an agent and a customer or a conference call between an agent and two or more customers. The communication session can be mode-neutral so that users in the session can communicate using any of a number of communication modes such as telephone, cellular phone, voice over IP (VoIP), video conference, text message, instant messaging, web-based chat, email, social networks, and so forth. This aspect can be important as customer service shifts away from an exclusively phone-based approach to a more diverse portfolio of communication modalities. The GUI allows call center agents to manipulate the communication session quickly and intuitively. Devices having different capabilities can present a suitable GUI tailored to those capabilities. For example, a desk phone may have a more powerful processor and graphics abilities, larger screen, more memory, higher bandwidth, and so forth than a mobile device. Such a desk phone can display the GUI with full interaction and animation, whereas the mobile communication device may only provide a subset of that full functionality suited to its own capabilities. Phones not having suitable displays can be coupled with a desktop or portable computing device for the various GUI displays and interactions.

The graphical elements can include images, caricatures, avatars, text, and a hyperlink to additional information related to a user associated with the graphical elements. The text can include a name, a title, a position, a telephone number, email address, a current status, presence information, and location. The system can change or animate the graphical elements based on a contacted party context, persona, trust, and presence. Active connections to the communication session can be visually represented as a graphical connection metaphor having overlapping graphical elements, a line connecting graphical elements, a shape connecting graphical elements, a shape with radiating lines connecting graphical elements, and/or a common augmented appearance of graphical elements. Overlapping or otherwise grouping graphical elements can represent individuals at one location. In such a case, information about the location can also be provided. Further, changing color, thickness, animation, texture, and/or length of graphical elements can indicate a relationship or status of entities represented by the graphical elements.

FIG. 2 illustrates a first graphical view 200 of a communication session between a call center agent 202 and a customer or caller 204. A system 100, such as the one described in FIG. 1, can be configured to display a graphical user interface to the call center agent 202 and receive input for manipulating the communication session. In one aspect, the system 100 interacts with a communications device, such as a telephone, instant messenger, personal or mobile computer, or email device. In another aspect, the system 100 integrates the functions of one or more communications device. The system 100 receives input via a physical or on-screen keyboard, mouse, stylus, touch screen, speech command, single-touch or multi-touch gestures, and/or touchless gestures. The system 100 can also receive multi-modal input.

In an initial state before a communication session is established, the system 100 can show a blank home screen where the graphical elements representing participants or communications utilities 202, 204 are shown.

In one aspect, a call center agent display in its initial state shows a queue of calling or contacting parties to indicate what the agent can expect. Such a queue can also show the communication mode so the agent knows about impending mode switches before they occur. An initial display can also include smart screen pops of customer data such as account information, special privileges, products owned, and the like that are associated with each calling or contacting party in the agent's queue.

The agent can provide instructive input of any kind to expose these smart screen pops for agent sessions that are not currently being served. Also, the system 100 can display information gathered via an Interactive Voice Response (IVR) or other media query about topics of interest to the individual in the queue. In the case of multiple customers having the same question about the same product for example, the agent may join, via the GUI, icons for such like customers together in a group to serve them simultaneously in a single communication session. Supervisors, or virtual system equivalents, can have the ability on their screens to view any agent's queue, move queue traffic from agent to another, view the skills that each agent possesses (for example, language, product, training, handling of high profile customers, and any other skills). Subject matter expert displays can include a palette of product or other specialized information which can be called up and either sent as a file to the customer (or the agent) of the contact center. Alternatively, the supervisor can manually communicate the information to the customer and/or the agent.

The blank screen can include a wallpaper image or other pattern. In one variation, the system 100 displays a summary or welcome page showing a short summary of news, messages, contacts, upcoming calendar events, and/or configuration options. In yet another variation, the system 100 displays a default input mechanism, such as a ten-key numeric pad for dialing telephone numbers or selecting one or more contact from a list of contacts with which to establish a communication session. In a call center environment, the system 100 can further display either a queue of callers or customers waiting to be picked up by an agent or a short summary of such a queue.

An incoming communication session can be an incoming phone call, incoming instant message, incoming text message, or, an incoming video conference. The system 100 can represent the incoming communication session as an icon. The icon can include sub-parts such as a name/title and a communication modality icon, among others. The incoming call icon 514 can blink, bounce, pulse, grow, shrink, vibrate, change color, send an audible alert (such as a ringtone), and/or provide some other notification to the user of the incoming call.

The call center agent can interact with the incoming communication session, for example, by clicking and dragging a modality icon onto an accept icon or clicking on the incoming communication session icon. The user can also provide other types of input to interact with communication sessions, such as tapping an icon via a touch screen or stylus, a flicking gesture, mouse clicks/movements, speech input, keyboard input, swipes or taps on a touch-sensitive surface, and/or any other combination of suitable user input. In the case of touch, for example, taps of different duration or pressure can perform different actions. Mouse input can include movement, clicks, right clicks, double clicks, dragging, flicking, hovering, gestures, and so forth. Actions can include ignore, send message, accept, and so forth.

In order to establish a communication session, the call center agent's device receives an inbound call or makes an outbound call and connects the customer 204 with the call center agent 202. When a call, instant message, text message, videoconference, or the like with a customer begins, the system 100 establishes a connection to the other party and displays to the call center agent 202 a graphical representation of the communication session with the other party on the screen. The customer display 204 can show all or part of the corresponding customer side of the communication session. The call center agent 202 can then add additional parties to the communication session by manipulating elements of the GUI. The call center agent 202 can remove participants from a communication session by dragging them to a trash can icon, clicking an X associated with that participant, or clicking a physical or graphical hang up button. In one aspect where the communication session is via telephone, the system 100 removes participants from the communication session when either party hangs up the telephone receiver. As participants leave the communication session, the system 100 removes their icon from the graphical representation of the communication session. When a call center agent 202 completes a communication session, the system 100 or a supervisor can return the call center agent 202 to a pool or queue of available, free, or idle call center agents.

The display 200 shows a communication session of two connected graphical elements 202, 204. The displayed communication session 200 represents a real-time communication. In this case, the real-time communication is a two-way tech support or customer service style call between Agent #619 and Frank Rose, shown by connecting lines between their respective icons 202, 204. FIG. 2 is a graphical display of the conference call from the call center agent's point of view.

The graphical elements here are icons, but can also include images, text, video, animations, sound, caricatures, and/or avatars. Users can personalize their own graphical elements or feed a live stream of images from a camera or video camera, for example. In addition, the graphical elements can have an associated string of text directly beneath them. The string of text can include a name, a title, a position, a telephone number, email address, a current status, a case number such as is shown in FIG. 2 as #601-UMD9, a model number (to identify a particular product model for troubleshooting such as is shown in FIG. 2 as #Z1C02), presence information, location, and/or any other available information. The string of text can be separate from but associated with the graphical element, as shown in FIG. 2. Alternatively, the system 100 can overlay the string of text on top of the graphical element or integrate the text as part of the graphical element. All or part of the text and/or the graphical elements can be hyperlinks to additional information related to the user associated with the text or graphical elements, such as a blog or micro blog, email address, presence information, and so forth.

The system 100 can include for each icon a graphical sub-element that indicates the communication mode for each participant. The system 100 is mode-neutral, meaning that the system 100 treats each mode of communication the same, such as telephone, cellular phone, voice over IP (VoIP), instant messaging, e-mail, text messaging, and video conferencing. As a user changes from one mode to another, the sub-elements can change accordingly. For example, if Frank Rose 204 changes from a landline to a cellular phone mid-call, the system 100 can change a telephone icon to a mobile phone icon.

The graphical elements can also convey information about the support call by changing type, size, color, border, brightness, position, and so forth. The lines, for example, can convey relationships between participants, customer importance, and the like. A user can manually trigger the changes for their own icon or others' icons, or the system 100 can detect change events and change the graphical elements accordingly. Change events can be based on a number of communications about a single topic, amount of time in queue, amount of time in the current communication session, context, persona, and/or presence. For example, as one person is talking, the system 100 can enlarge their icon. As another example, the system 100 can track how much each person in the conference call is talking and move graphical elements up and down based on a total talk time in the conference call.

In another variation, the system 100 modifies the links connecting the graphical elements by changing their thickness, length, color, style, and/or animating the links. These modifications can represent a currently talking party, shared resources, an active communication session, a held communication session, a muted communication session, a pending communication session, a connecting communication session, a multi-party line, a sidebar conversation, a monitored transfer, an unmonitored transfer, selective forwarding, selective breakup of the communication session into multiple communication sessions, and so forth. Since the agent view is fairly static in the case of a contact center, the system 100 can automatically replace the previous customer with the next customer in the queue by moving the icon and the connecting line (if any) into alignment with the agent's icon. Similarly, on the other side, the system 100 can display a group of human resources (Supervisor, Subject Matter Experts, etc.) that can be dragged and dropped or otherwise moved and located to connect with the agent and/or the caller in a manner analogous to the material resources discussed below. The call center agent 202 can share resources such as documents, images, programs (such as troubleshooting utilities), links, audio, and other data via the communication session with the customer 204 by dragging an icon representing the resource to share and dropping it either on the customer 204 icon or anywhere else on the communication session. The system 100 can determine how to grant access to the shared resource to the customer 204, such as via email, a hyperlink, or text message.

In one aspect, a user clicks and drags (or taps and drags with a touch screen) icons to manipulate the conference call. For example, the user can click an escalate icon 208, a transfer icon 210, a consult icon 212, a record icon 214, or 216 to invite another user to join the communication session. A user can drag these icons and drop them on a contact or on a participant in a current communication session. For example, if an incoming communication session is in one modality (IM for example), the user can drag the call icon onto the incoming communication session to accept the incoming communication session but transcode it from IM to a call. A user can also initiate a communication session by dragging and dropping an appropriate icon onto a contact. In one variation, a call center agent drags the escalate icon 208 onto the communication session and the system 100 displays a contextual menu of the currently available escalation individuals. Alternatively, the system 100 can display available resources on a dynamic basis which can be used as needed by connecting them to the agent and/or customer. The system 100 can display other information as well, such as a calendar, notes, memos, personal presence information, and time. The system 100 display can be user-configurable.

In another aspect, user preferences guide the amount and type of information conveyed by the graphical elements and the associated text. User preferences can be drawn from a viewer's preferences and/or a source person's preferences. For example, a viewer sets preferences to show others' email addresses when available, but a source person sets preferences as never share email address. The source person's preferences (or preferences of the "owner" of the information) can override a third party's preferences. Each participant in the communication session 201 or contact in a list of contacts can have multiple associated addresses, phone numbers, or points of contact, such as a work phone, home phone, mobile phone, work email, home email, AIM address, Facebook chat address, and the like and that each may have an icon or a qualifier such as a symbol that indicates not only the party but the contact mode.

Users can change their own mode of communication by tapping on a different connection modality icon, for example. This allows a user to manually and seamlessly switch over from one modality to another mid-session. For example, a user participating in a communication session via cell phone who is now near a webcam can drag a video conferencing icon onto the communication session to switch from cell phone to video conferencing.

Figure 3:
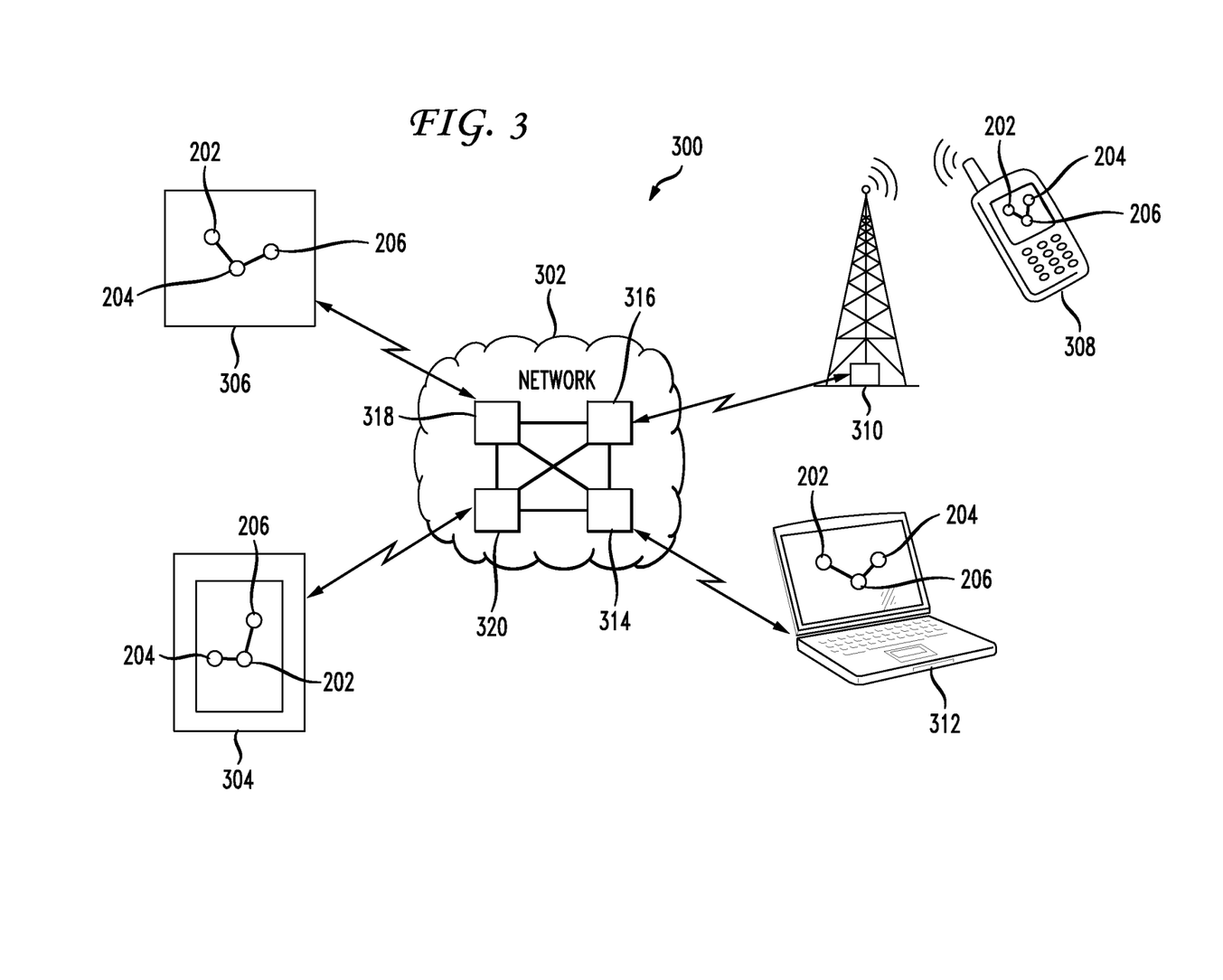
FIG. 3 illustrates a network view of a communication session.

Having discussed several variations of FIG. 2, the discussion now turns to a network view 300 of the communication session as shown in FIG. 3. A telecommunications network 302 connects various communications devices 304, 306, 308, 310, 312 and conveys information from device to device. The telecommunications network can be one of or a combination of a plain old telephone service (POTS) network, an asynchronous transfer mode (ATM) network, an integrated services digital network (ISDN), frame relay network, Ethernet network, token ring network, and any other suitable wired or wireless network. The network can include one or more interconnected nodes 314, 316, 318, 320 which perform all or part of the connection and transmission functionality that underlies the graphical representation of communication sessions on a GUI. Such network nodes 314, 316, 318, 320 can perform all the functionality in the network 302 or can operate in conjunction with end-user communication devices 304, 306, 308, 312 to manipulate communication sessions.

In one aspect, a centralized entity controls the communication session. The centralized entity can reside in the network or communicate via the network. The centralized entity can operate as a centralized enterprise intelligence server. In another aspect, the communication session control and functionality is distributed among multiple server resources 314, 316, 318, 320 in the network or cloud. In addition to a centralized intelligence and distributed intelligence in the cloud, the network 302 can provide this functionality using a peer-to-peer approach with intelligence on the endpoints. Some variations include providing standardized functionality on a standards-compliant server and non-standardized functionality distributed across the endpoints.

The display of each communications device shows a different aspect or view of the same communication session. For example, the display of device 304 shows the same display of the same participants 202, 204, 206 as shown in FIG. 2. The display of device 306 shows the same participants 202, 204, 206 in a different view of the communication session from the perspective of device 306. Likewise devices 308 and 312 show the same participants 202, 204, 206 in different views. In one aspect, a mobile device 308 connects with a wireless transmitter 310 to connect to the network. A mobile device 308 can generate its own view of the communication session or it can generate a duplicate or a companion view of another device's display. In the case of a call center however, a customer display may show only a portion of or none of the details that a call center agent display shows for various security, privacy, trade secret, or other purposes.

Figure 4:
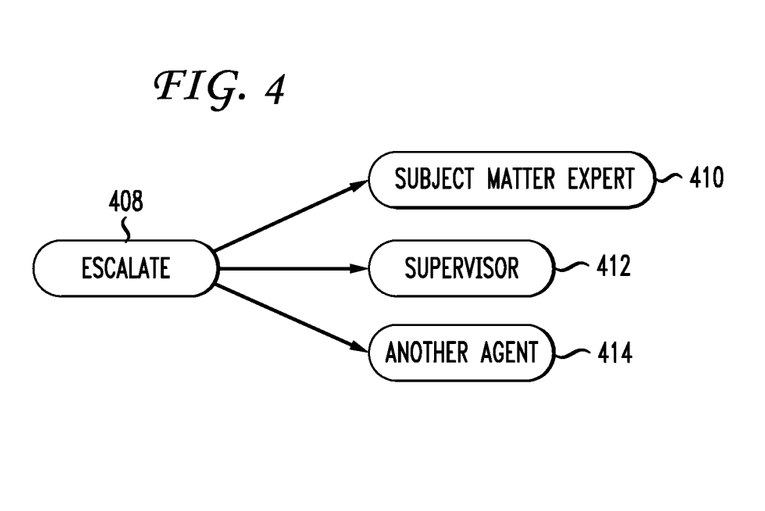
FIG. 4 illustrates an exemplary sub-menu for an escalate button.

The discussion now returns to the call center GUI for managing a communication session as shown in FIG. 2, particularly the various action icons or buttons 208, 210, 212, 214. FIG. 4 illustrates an exemplary sub-menu for an escalate button 408. In this variation, when a call center agent clicks the escalate button 408, the system 100 displays a contextual menu to disambiguate the escalation request. The disambiguation menu can have a root node "escalate" 408 and three expanded nodes for clarifying how or to whom to escalate, "subject matter expert" 410, "supervisor" 412, and "another agent" 414. Alternatively, the call center agent 202 can browse through a list or icon-based display of available escalation individuals, subject matter experts, and/or supervisors and drag and drop an icon of a desired individual on the graphical representation of the communication session. The list of escalation individuals can be part of a list of contacts. The system 100 then automatically contacts that person in their preferred mode and joins that person to the conference call.

Figure 5:
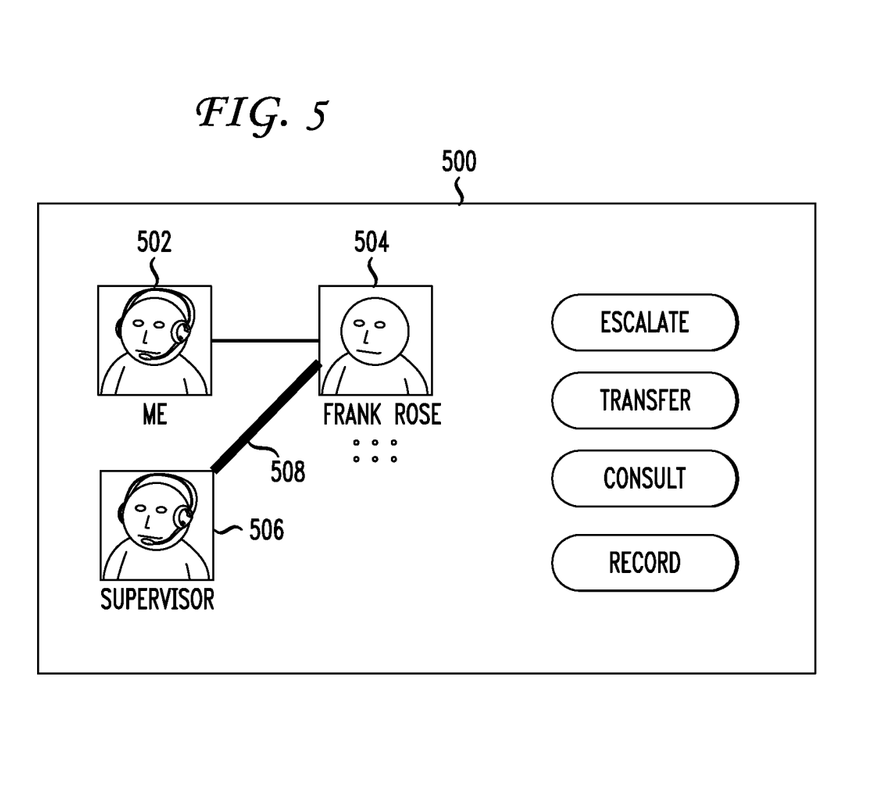
FIG. 5 illustrates an exemplary call center agent display showing a graphical representation of a communication session with a caller after escalating to a supervisor.

FIG. 5 illustrates an exemplary call center agent display 500 showing a graphical representation of a communication session between a call center agent 502 and the caller Frank Rose 504 after escalating to a supervisor 506. The call center agent display 500 includes a new connecting link 508 to the supervisor 506. The graphical link 508 connecting the supervisor can represent that only the supervisor 506 has the ability to terminate that link 508 and drop off the communication session. The supervisor 506, the caller Frank Rose 504, and the call center agent 502 communicate in a common session such as a three-way conference call. As discussed earlier, it is more likely that the agent will be depicted somewhere in the center of the GUI with the queue on one side and resources on the other. Less is more with regard to clicks or other agent entries so dynamically depicting the available resources (both human and material) as lists or groups of icons that are topically germane to the customer's motivation for the session is probably the most likely scenario. In one aspect, the system 100 automatically sets up a sidebar, or a separate concurrent communication session between the supervisor 506 (or other escalation individual) and the call center agent 502 in order to discuss certain matters without caller's 504 knowledge. This can be done as a low level whisper announcement to the agent as well using the same communication session. For example, if the main communication session is via telephone, the sidebar communication session between the call center agent 502 and the supervisor 506 can be via instant message. The supervisor 506 can remain on the communication session, transfer control back to the call center agent 502, silently monitor the remainder of the communication session, and so forth.

After the last participant leaves the communication session, the system 100 terminates the communication session. In some instances, the system 100 places the call center agent 502 in a busy or unavailable mode for a duration after the communication session terminates. This duration can allow the call center agent 502 to enter required notes and comments in the caller's case file or follow other post-call procedures.

Figure 6:
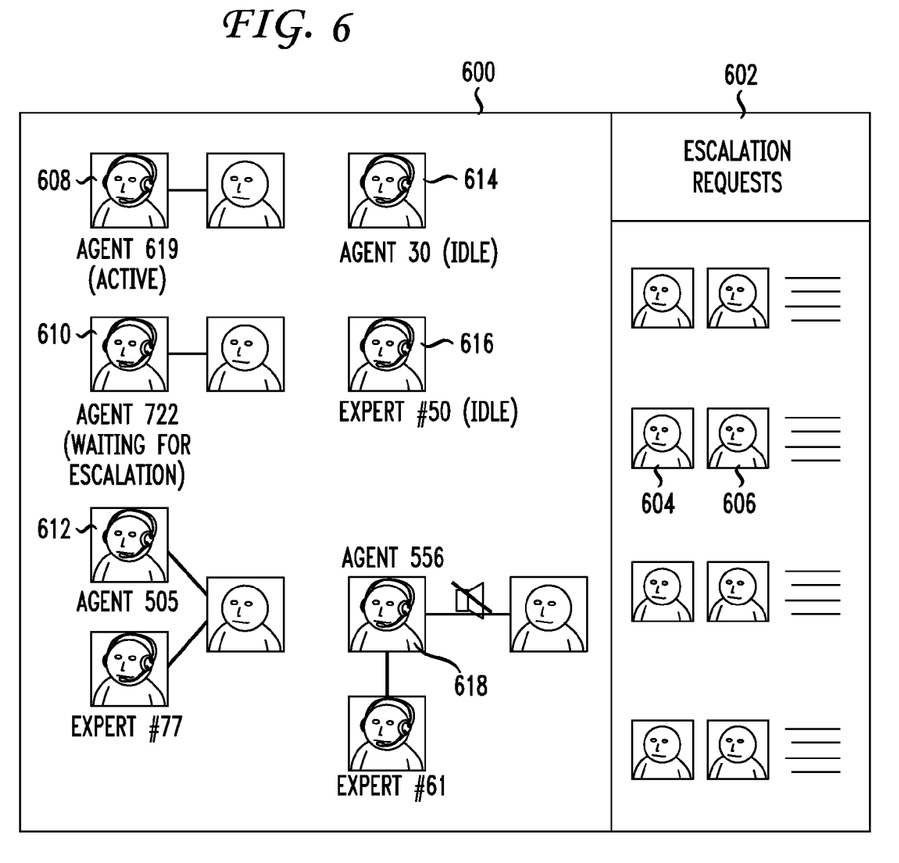
FIG. 6 illustrates an exemplary call center supervisor display showing the current communication sessions in a call center.

Now the discussion turns to a call center manager or supervisor view of current communication sessions for a group of call center agents. FIG. 6 illustrates an exemplary call center supervisor display 600 showing the current communication sessions involving call center agents in a call center. The display 600 includes a listing of escalation requests 602. Each escalation request can be directed to any supervisor, a specific supervisor, to a group of escalation individuals, or to another individual. Each escalation request can include an icon for a call center agent 604 and a caller 606 as well as a short description of relevant information. The escalation requests can include a timer showing how much time has passed since the escalation request was created. As escalation requests are assigned to subject matter experts, supervisors, or other individuals, the system 100 removes them from the list of escalation requests 602. The call center agents shown on the supervisor display 600 can be located in a same call center facility or can be distributed throughout multiple facilities, such as distance workers who work from home. For example, in the case of chat-based technical support or customer service, call center agents do not handle calls at all and can be located virtually anywhere if they interact with customers/callers via text messaging on a mobile device.

A supervisor view 600 of call center agents' communication sessions can be limited to call center agents over which the supervisor has authority. In one aspect, the supervisor view shows call center agents outside the supervisor's authority but only allows the supervisor limited options to manipulate or interact with those call center agents outside the supervisor's authority.

The call center supervisor display 600 also includes a graphical representation of all the current communication sessions in the group of call center agents, optionally including call center agents who are idle (i.e. waiting for a communication session) or otherwise not in an active communication session. For example, the supervisor display 600 can show active communication sessions 608 between a call center agent and a caller, agents waiting for escalation with a caller 610, escalated communication sessions 612 which involve a call center agent, an expert, and a caller all on the same bridged session, idle call center agents 614 (including available agents and unavailable agents), idle subject matter experts 616, and communication sessions where the caller is on hold or muted while the agent confers with a supervisor or subject matter expert 618. Information associated with agents or other resources controlled by the supervisor may include a skill set listing such as languages, products, expertise, existing relationships with customers, and the like. As discussed above, the communication sessions can occur in multiple modalities. Some agents may interact with customers via online chat, some via text message, some via telephone, some via video conference, and so forth. In the case of instant messaging particularly, one call center agent can interact with multiple customers simultaneously. The system can display an icon of the same agent multiple times in the supervisor display 600 or can display multiple customers connected to a single icon for the agent.

The call center supervisor can selectively listen in on or otherwise view agent interactions with customers with or without the agent's knowledge. In other words, listening in as a supervisor would not alter the agent's display of the communication session even though the supervisor is actually a party to the communication session. In one aspect, the call center supervisor display 600 includes automatically updated text generated via automatic speech recognition (ASR) of each communication session. The supervisor may be able to have the text from multiple agent—customer interactions scrolled across their display and based on observations selectively join into communications sessions for monitoring and/or direct interaction.

The system 100 can provide a mechanism to filter the active communication sessions based on seniority, call duration, length of queue, average queue waiting time, remaining time in the agent's shift, performance (based on callers served, money earned, etc.), name, caller region, and/or any other desired attribute. The Supervisor's display may also present graphs or charts showing the aggregate and total performance metrics for the agents under their management. Warning flags about stress, slow queue processing can be used to allow certain agents to take a break to improve their performance.

The supervisor can also broadcast messages to all agents as a mass sidebar communication. The supervisor can similarly drag an instant messaging (or other) icon onto any one of the call center agents or experts to initiate an instant messaging communication session with that call center agent or expert. A supervisor or subject matter expert can select a group of call center agents to include in a group communication session for training purposes, for example.

In one aspect, the supervisor and/or call center agent display can include icons for other departments (such as accounting, billing, technical support, new accounts). When an agent or supervisor notices a misdirected caller that is better served in another call center department or skill, the agent or supervisor drags the caller icon to the appropriate department icon. The system 100 can perform a warm handoff or a cold handoff of the caller to the appropriate department's queue or directly to an agent in that department. A warm handoff is when the transferring agent stays on the line until the transferred-to agent accepts the communication session. A cold handoff is when the transferring agent drops off the line before the transferred-to agent accepts the communication session.

Figure 7:
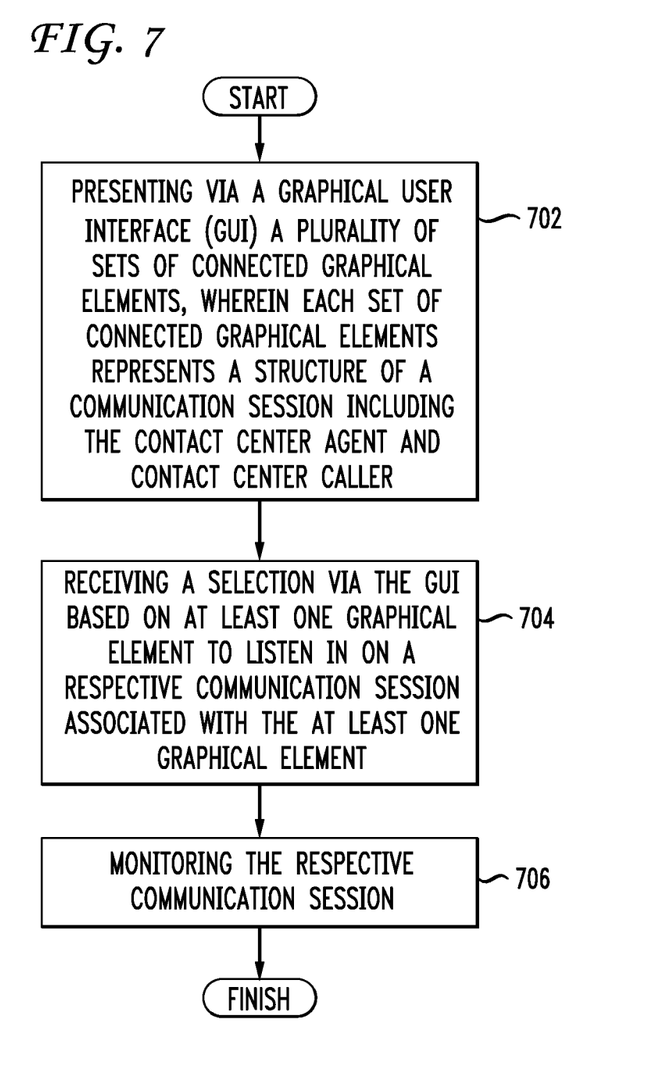
FIG. 7 illustrates a first exemplary method embodiment.

FIG. 7 illustrates a first exemplary method embodiment for monitoring communications in a contact center. The system 100 presents via a graphical user interface (GUI) a plurality of sets of connected graphical elements, wherein each set of connected graphical elements represents a structure of a communication session including the contact center agent and contact center caller (702). Each set of connected graphical elements can include an indication of a current communication session status, such as "on hold", "gathering customer information", or "escalating to supervisor". Contact center agents can include subject matter experts, front-line contact center agents, and/or supervisors.

The system 100 receives a selection via the GUI based on at least one graphical element to listen in on a respective communication session associated with the at least one graphical element (704). The call center agent can make the selection by dragging and dropping icons, clicking on icons, providing keyboard or mouse input, touching a touch screen, and/or voice commands. The graphical elements can be an icon representing the caller and smart screen pops related to or describing the caller. The smart screen pops can include one or more of a name, an address, hyperlinks, call duration, a profile, a profile summary, a call history, warranty or other account information, suggested sales targets for the call center agent, demographic information, and caller preferences.

The system 100 monitors the respective communication session (706). The system 100 optionally records the respective communication session.

Figure 8:
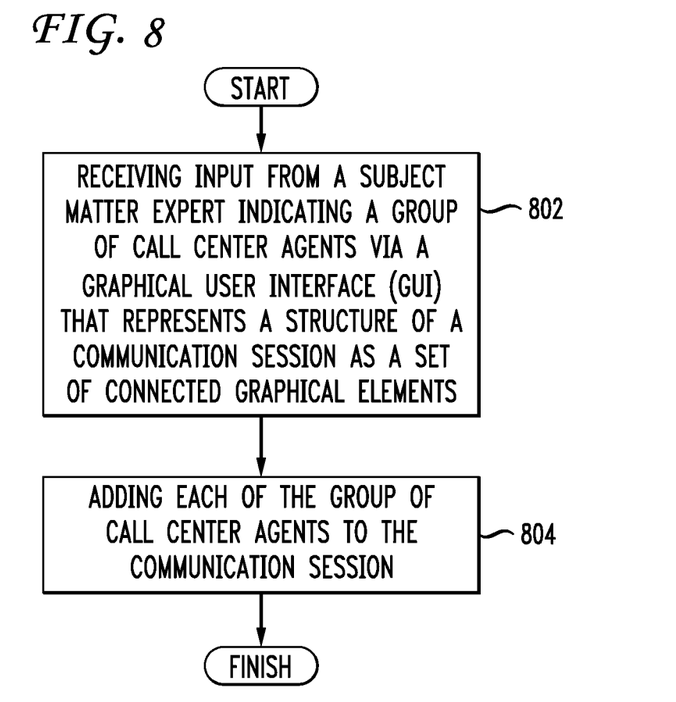
FIG. 8 illustrates a second exemplary method embodiment.

FIG. 8 illustrates a second exemplary method embodiment for bridging call center agents with a subject matter expert in a contact center. The system 100 receives input from a subject matter expert indicating a group of call center agents via a graphical user interface (GUI) that represents a structure of a communication session as a set of connected graphical elements (802). The group of call center agents can be in different physical facilities. For example, a first subgroup of the call center agents may be in Arkansas while a second subgroup of the call center agents may be in Utah. The subject matter expert can share resources with the group of call center agents via the communication session. For example, the subject matter expert can drag and drop a Microsoft PowerPoint presentation onto the communication session. The system 100 sends all or part of the presentation to devices associated with the participating agents for display. Other resources include text, a document, an audio file, a video, and other electronic resources.

The system 100 adds each of the group of call center agents to the communication session (804). When the subject matter expert leaves the communication session, the system 100 can terminate the communication session or leave the communication session in place until all remaining agents also leave the communication session.

Figure 9:
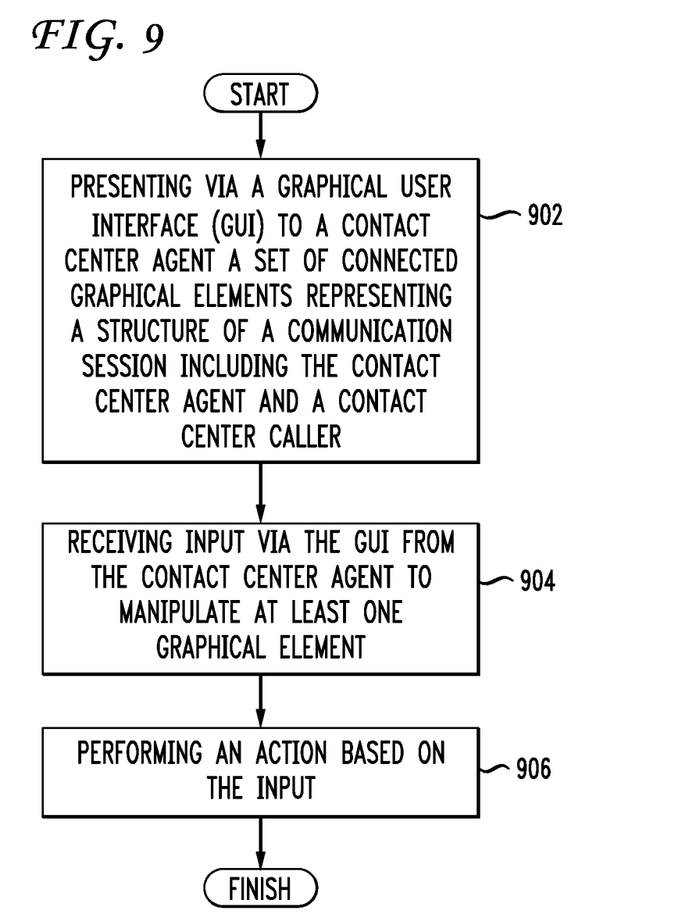
FIG. 9 illustrates a third example method embodiment.

The disclosure now turns to the third exemplary method embodiment shown in FIG. 9. For the sake of clarity, the method is discussed in terms of an exemplary system such as is shown in FIG. 1 configured to practice the method.

FIG. 9 illustrates a first exemplary method embodiment for managing contact center communications. The system 100 presents via a graphical user interface (GUI) to a contact center agent a set of connected graphical elements representing a structure of a communication session including the contact center agent and a contact center caller (902). The set of connected graphical elements can include smart screen pops related to the contact center caller. The smart screen pops can include a name, an address, hyperlinks, total call time, motivation for communicating, queue time, a profile, a profile summary, a call history, warranty information, sales targets, demographic information, and contact center caller preferences. These are just some examples of helpful information which can be displayed in a smart screen pop. In some instances, a call center agent can customize which pieces of information appear in smart screen pops and when smart screen pops occur.

The system 100 receives input via the GUI from the contact center agent to manipulate at least one graphical element (904). The input can be clicking on or selecting icons or dragging and dropping icons. The call center agent input can be received via virtually any human interface device.

The system 100 performs an action based on the input (906). In one aspect, the action is to escalate the communication session. The system 100 can escalate the communication session by adding an escalation individual to the communication session and, upon receiving additional input via the GUI from the contact center agent and/or the escalation individual, dropping the contact center agent from the communication session. Escalation individuals can include subject matter experts, different call center agents, and supervisors.

In another aspect, the action is to consult separately from the communication session. The system can allow the call center agent to consult separately from the caller by establishing a concurrent communication session including the contact center agent and one of a subject matter expert, a different call center agent, and a supervisor, wherein the concurrent communication session is separate from the communication session, upon receiving additional input via the GUI terminating the concurrent communication session, and returning the contact center agent to the communication session. Other actions include transferring the communication session to a different department and recording the communication session.

The ability to at the agent's discretion to contact any party that was prematurely dropped from the communication session should also be discussed. Essentially it would amount to the ability to use system and network information to recreate the session without the party having to wait in a queue to be rejoined potentially to a different agent. Use of alternate media could be used such as IM to determine if the customer had to drop off and prefers not to be rejoined immediately.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    presenting, via a graphical user interface for an agent, a set of connected graphical elements representing a structure of a communication session among the agent, a caller, and a supervisor added to the communication session after an escalation event, wherein the communication session is agnostic with respect to a mode of communication associated with each participant in the communication session, and wherein the set of connected graphical elements are visually connected via a connection metaphor among the agent, the caller, and the supervisor, the connection metaphor comprising a visual connection between the caller and the supervisor and representing a communications link between the caller and the supervisor, and wherein the visual connection comprises an indication that, between the agent and the supervisor, only the supervisor has an ability to terminate the communications link between the caller and the supervisor;
    receiving input via the graphical user interface to manipulate a graphical element from the set of connected graphical elements;
    modifying the communication session based on the input to yield a modified communication session; and
    based on a determination that the caller was prematurely disconnected from the modified communication session, recreating the modified communication session by rejoining the caller without placing the caller in a queue to be rejoined potentially to a different agent.

2. The method of claim 1, wherein the communication session further includes an escalation individual who is one of a subject matter expert and a different agent.

3. The method of claim 1, wherein modifying the communication session further comprises consulting separately from the communication session.

4. The method of claim 3, wherein consulting separately from the communication session comprises:
    establishing a concurrent communication session between the agent and one of a subject matter expert, a different agent, and a supervisor, wherein the concurrent communication session is separate from the communication session;
    upon receiving additional input via the graphical user interface, terminating the concurrent communication session; and
    returning the agent to the communication session.

5. The method of claim 1, wherein modifying the communication session further comprises transferring the communication session to a different department.

6. The method of claim 1, wherein modifying the communication session further comprises recording the communication session.

7. The method of claim 1, wherein the set of connected graphical elements comprises smart screen pops related to the caller.

8. The method of claim 7, wherein the smart screen pops comprise at least one of a name, an address, hyperlinks, total call time, a profile, a profile summary, a call history, warranty information, suggested sales targets, demographic information, and contact center caller preferences.

9. The method of claim 1, wherein the indication further indicates that the agent lacks the ability to terminate the communications link between the caller and the supervisor.

10. The method of claim 1, wherein the graphical user interface presents available resources as groups of graphical elements that are topically germane to the communication session.

11. The method of claim 1, wherein the set of connected graphical elements comprises a first graphical element, a second graphical element, and a third graphical element, the first graphical element representing the agent, the second graphical element representing the caller, and the third graphical element representing the supervisor.

12. The method of claim 1, wherein the escalation event comprises adding an escalation individual to the communication session.

13. A system comprising:
    a processor; and
    a computer-readable storage device storing instructions which, when executed by the processor, cause the processor to perform operations comprising:
        presenting, via a graphical user interface for an agent, a set of connected graphical elements representing a structure of a communication session among the agent, a caller, and a supervisor added to the communication session after an escalation event, wherein the communication session is agnostic with respect to a mode of communication associated with each participant in the communication session, and wherein the set of connected graphical elements are visually connected via a connection metaphor among the agent, the caller, and the supervisor, the connection metaphor comprising a visual connection between the caller and the supervisor and representing a communications link between the caller and the supervisor, and wherein the visual connection comprises an indication that, between the agent and the supervisor, only the supervisor has an ability to terminate the communications link between the caller and the supervisor;
        receiving input via the graphical user interface to manipulate a graphical element from the set of connected graphical elements; and
        modifying the communication session based on the input to yield a modified communication session; and
        based on a determination that the caller was prematurely disconnected from the modified communication session, recreating the modified communication session by rejoining the caller without placing the caller in a queue to be rejoined potentially to a different agent.

14. The system of claim 13, wherein modifying the communication session further comprises transferring the communication session to a different department.

15. The system of claim 13, wherein modifying the communication session further comprises recording the communication session.

16. The system of claim 13, wherein the indication further indicates that the agent lacks the ability to terminate the communications link between the caller and the supervisor.

17. A computer-readable storage device storing instructions which, when executed by a processor, cause the processor to perform operations comprising:

presenting, via a graphical user interface for an agent, a set of connected graphical elements representing a structure of a communication session among the an agent, a caller, and a supervisor added to the communication session after an escalation event, wherein the communication session is agnostic with respect to a mode of communication associated with each participant in the communication session, and wherein the set of connected graphical elements are visually connected via a connection metaphor among the agent, the caller, and the supervisor, the connection metaphor comprising a visual connection between the caller and the supervisor and representing a communications link between the caller and the supervisor, and wherein the visual connection comprises an indication that, between the agent and the supervisor, only the supervisor has an ability to terminate the communications link between the caller and the supervisor;

receiving input via the graphical user interface to manipulate a graphical element from the set of connected graphical elements; and modifying the communication session based on the input to yield a modified communication session; and based on a determination that the caller was prematurely disconnected from the modified communication session, recreating the modified communication session by rejoining the caller without placing the caller in a queue to be rejoined potentially to a different agent.

18. The computer-readable storage device of claim 17, wherein modifying the communication session further comprises transferring the communication session to a different department.

19. The computer-readable storage device of claim 17, wherein modifying the communication session further comprises recording the communication session.

20. The computer-readable storage device of claim 17, wherein the indication further indicates that the agent lacks the ability to terminate the communications link between the caller and the supervisor.

* * * * *